US012489657B2

(12) United States Patent
Oltchik et al.

(10) Patent No.: US 12,489,657 B2
(45) Date of Patent: Dec. 2, 2025

(54) IN-NETWORK COMPUTE OPERATION SPREADING

(71) Applicant: Mellanox Technologies, Ltd., Yokneam (IL)

(72) Inventors: Yishai Oltchik, Givatayim (IL); Anton Korzh, Eagle, ID (US); Gil Bloch, Zichron Yaakov (IL); Itamar Rabenstein, Petach Tikva (IL)

(73) Assignee: Mellanox Technologies, Ltd., Yokneam (IL)

( * ) Notice: Subject to any disclaimer, the term of this patent is extended or adjusted under 35 U.S.C. 154(b) by 287 days.

(21) Appl. No.: 18/451,134

(22) Filed: Aug. 17, 2023

(65) Prior Publication Data

US 2025/0062933 A1 Feb. 20, 2025

(51) Int. Cl.
*H04L 12/54* (2022.01)

(52) U.S. Cl.
CPC .................................. *H04L 12/56* (2013.01)

(58) Field of Classification Search
CPC ....................................................... H04L 12/56
See application file for complete search history.

(56) References Cited

U.S. PATENT DOCUMENTS

| 4,933,969 | A | 6/1990 | Marshall et al. |
|---|---|---|---|
| 5,068,877 | A | 11/1991 | Near et al. |
| 5,325,500 | A | 6/1994 | Bell et al. |
| 5,353,412 | A | 10/1994 | Douglas et al. |
| 5,404,565 | A | 4/1995 | Gould et al. |
| 5,408,469 | A | 4/1995 | Opher et al. |
| 5,606,703 | A | 2/1997 | Brady et al. |
| 5,944,779 | A | 8/1999 | Blum |

(Continued)

FOREIGN PATENT DOCUMENTS

| CN | 103095607 A | 5/2013 |
|---|---|---|
| CN | 109617640 A | 4/2019 |

(Continued)

OTHER PUBLICATIONS

Xu et al., "SLOAVx: Scalable Logarithmic AlltoallV Algorithm for Hierarchical Multicore Systems", 13th IEEE/ACM International Symposium on Cluster, Cloud, and Grid Computing, pp. 369-376, year 2013.

(Continued)

*Primary Examiner* — Walli Z Butt
(74) *Attorney, Agent, or Firm* — Meitar Patents Ltd.; Daniel Kligler

(57) ABSTRACT

In one embodiment, a network switch device includes a network interface to receive vectors from endpoint devices, and an aggregation and reduction accelerator to perform elementwise and vector splitting operations with the vectors as input yielding at least two intermediate vector results, wherein the network interface is to send the at least two intermediate vector results to different corresponding network switches in different switch aggregation trees, receive at least two final vector results of an aggregation and reduction process from the different switch aggregation trees, and combine the at least two final vector results to yield a combined final vector result, wherein the network interface is to send the combined final vector result to the endpoint devices.

23 Claims, 4 Drawing Sheets

(56) References Cited

U.S. PATENT DOCUMENTS

| | | |
|---|---|---|
| 6,041,049 A | 3/2000 | Brady |
| 6,115,394 A | 9/2000 | Balachandran et al. |
| 6,212,197 B1 | 4/2001 | Christensen et al. |
| 6,370,502 B1 | 4/2002 | Wu et al. |
| 6,438,137 B1 | 8/2002 | Turner et al. |
| 6,483,804 B1 | 11/2002 | Muller et al. |
| 6,507,562 B1 | 1/2003 | Kadansky et al. |
| 6,728,862 B1 | 4/2004 | Wilson |
| 6,857,004 B1 | 2/2005 | Howard et al. |
| 6,937,576 B1 | 8/2005 | Di Benedetto et al. |
| 7,102,998 B1 | 9/2006 | Golestani |
| 7,124,180 B1 | 10/2006 | Ranous |
| 7,164,422 B1 | 1/2007 | Wholey, III et al. |
| 7,171,484 B1 | 1/2007 | Krause et al. |
| 7,224,669 B2 | 5/2007 | Kagan et al. |
| 7,245,627 B2 | 7/2007 | Goldenberg et al. |
| 7,313,582 B2 | 12/2007 | Bhanot et al. |
| 7,327,693 B1 | 2/2008 | Rivers et al. |
| 7,336,646 B2 | 2/2008 | Muller |
| 7,346,698 B2 | 3/2008 | Hannaway |
| 7,555,549 B1 | 6/2009 | Campbell et al. |
| 7,613,774 B1 | 11/2009 | Caronni et al. |
| 7,636,424 B1 | 12/2009 | Halikhedkar et al. |
| 7,636,699 B2 | 12/2009 | Stanfill |
| 7,676,597 B2 | 3/2010 | Kagan et al. |
| 7,738,443 B2 | 6/2010 | Kumar |
| 7,760,743 B2 | 7/2010 | Shokri et al. |
| 8,213,315 B2 | 7/2012 | Crupnicoff et al. |
| 8,255,475 B2 | 8/2012 | Kagan et al. |
| 8,370,675 B2 | 2/2013 | Kagan |
| 8,380,880 B2 | 2/2013 | Gulley et al. |
| 8,510,366 B1 | 8/2013 | Anderson et al. |
| 8,645,663 B2 | 2/2014 | Kagan et al. |
| 8,738,891 B1 | 5/2014 | Karandikar et al. |
| 8,761,189 B2 | 6/2014 | Shachar et al. |
| 8,768,898 B1 | 7/2014 | Trimmer et al. |
| 8,775,698 B2 | 7/2014 | Archer et al. |
| 8,811,417 B2 | 8/2014 | Bloch et al. |
| 9,110,860 B2 | 8/2015 | Shahar |
| 9,189,447 B2 | 11/2015 | Faraj |
| 9,294,551 B1 | 3/2016 | Froese et al. |
| 9,344,490 B2 | 5/2016 | Bloch et al. |
| 9,397,960 B2 | 7/2016 | Arad et al. |
| 9,456,060 B2 | 9/2016 | Pope et al. |
| 9,563,426 B1 | 2/2017 | Bent et al. |
| 9,626,329 B2 | 4/2017 | Howard |
| 9,756,154 B1 | 9/2017 | Jiang |
| 10,015,106 B1 | 7/2018 | Florissi et al. |
| 10,027,601 B2 | 7/2018 | Narkis et al. |
| 10,158,702 B2 | 12/2018 | Bloch et al. |
| 10,284,383 B2 | 5/2019 | Bloch et al. |
| 10,296,351 B1 | 5/2019 | Kohn et al. |
| 10,305,980 B1 | 5/2019 | Gonzalez et al. |
| 10,318,306 B1 | 6/2019 | Kohn et al. |
| 10,320,508 B2 | 6/2019 | Shimizu et al. |
| 10,425,350 B1 | 9/2019 | Florissi |
| 10,515,045 B1 | 12/2019 | Mattina |
| 10,521,283 B2 | 12/2019 | Shuler et al. |
| 10,528,518 B2 | 1/2020 | Graham et al. |
| 10,541,938 B1 | 1/2020 | Timmerman et al. |
| 10,547,553 B2 | 1/2020 | Shattah et al. |
| 10,621,489 B2 | 4/2020 | Appuswamy et al. |
| 11,088,971 B2 | 8/2021 | Brody et al. |
| 11,196,586 B2 | 12/2021 | Graham et al. |
| 11,609,934 B2 | 3/2023 | Bensberg et al. |
| 11,750,699 B2 | 9/2023 | Graham et al. |
| 11,922,237 B1 | 3/2024 | Graham |
| 2002/0010844 A1 | 1/2002 | Noel et al. |
| 2002/0035625 A1 | 3/2002 | Tanaka |
| 2002/0150094 A1 | 10/2002 | Cheng et al. |
| 2002/0150106 A1 | 10/2002 | Kagan et al. |
| 2002/0152315 A1 | 10/2002 | Kagan et al. |
| 2002/0152327 A1 | 10/2002 | Kagan et al. |
| 2002/0152328 A1 | 10/2002 | Kagan et al. |
| 2002/0165897 A1 | 11/2002 | Kagan et al. |
| 2003/0018828 A1 | 1/2003 | Craddock et al. |
| 2003/0061417 A1 | 3/2003 | Craddock et al. |
| 2003/0065856 A1 | 4/2003 | Kagan et al. |
| 2003/0120835 A1 | 6/2003 | Kale et al. |
| 2004/0030745 A1 | 2/2004 | Boucher et al. |
| 2004/0062258 A1 | 4/2004 | Grow et al. |
| 2004/0078493 A1 | 4/2004 | Blumrich et al. |
| 2004/0120331 A1 | 6/2004 | Rhine et al. |
| 2004/0123071 A1 | 6/2004 | Stefan et al. |
| 2004/0252685 A1 | 12/2004 | Kagan et al. |
| 2004/0260683 A1 | 12/2004 | Chan et al. |
| 2005/0097300 A1 | 5/2005 | Gildea et al. |
| 2005/0122329 A1 | 6/2005 | Janus |
| 2005/0129039 A1 | 6/2005 | Biran et al. |
| 2005/0131865 A1 | 6/2005 | Jones et al. |
| 2005/0223118 A1 | 10/2005 | Tucker et al. |
| 2005/0281287 A1 | 12/2005 | Ninomi et al. |
| 2006/0095610 A1 | 5/2006 | Arndt et al. |
| 2006/0282838 A1 | 12/2006 | Gupta et al. |
| 2007/0127396 A1 | 6/2007 | Jain et al. |
| 2007/0127525 A1 | 6/2007 | Sarangam et al. |
| 2007/0162236 A1 | 7/2007 | Lamblin et al. |
| 2008/0040792 A1 | 2/2008 | Larson et al. |
| 2008/0059499 A1 | 3/2008 | Parkinson et al. |
| 2008/0104218 A1 | 5/2008 | Liang et al. |
| 2008/0126564 A1 | 5/2008 | Wilkinson |
| 2008/0168471 A1 | 7/2008 | Benner et al. |
| 2008/0181260 A1 | 7/2008 | Vonog et al. |
| 2008/0192750 A1 | 8/2008 | Ko et al. |
| 2008/0219159 A1 | 9/2008 | Chateau et al. |
| 2008/0244220 A1 | 10/2008 | Lin et al. |
| 2008/0263329 A1 | 10/2008 | Archer et al. |
| 2008/0288949 A1 | 11/2008 | Bohra et al. |
| 2008/0298380 A1 | 12/2008 | Rittmeyer et al. |
| 2008/0307082 A1 | 12/2008 | Cai et al. |
| 2009/0037377 A1 | 2/2009 | Archer et al. |
| 2009/0063816 A1 | 3/2009 | Arimilli et al. |
| 2009/0063817 A1 | 3/2009 | Arimilli et al. |
| 2009/0063891 A1 | 3/2009 | Arimilli et al. |
| 2009/0182814 A1 | 7/2009 | Tapolcai et al. |
| 2009/0240838 A1 | 9/2009 | Berg et al. |
| 2009/0247241 A1 | 10/2009 | Gollnick et al. |
| 2009/0292905 A1 | 11/2009 | Faraj |
| 2009/0296699 A1 | 12/2009 | Hefty |
| 2009/0327444 A1 | 12/2009 | Archer et al. |
| 2010/0017420 A1 | 1/2010 | Archer et al. |
| 2010/0049836 A1 | 2/2010 | Kramer |
| 2010/0074098 A1 | 3/2010 | Zeng et al. |
| 2010/0095086 A1 | 4/2010 | Eichenberger et al. |
| 2010/0185719 A1 | 7/2010 | Howard |
| 2010/0241828 A1 | 9/2010 | Yu et al. |
| 2010/0274876 A1 | 10/2010 | Kagan et al. |
| 2010/0329275 A1 | 12/2010 | Johnsen et al. |
| 2011/0060891 A1 | 3/2011 | Jia |
| 2011/0066649 A1 | 3/2011 | Berlyant et al. |
| 2011/0093258 A1 | 4/2011 | Xu et al. |
| 2011/0119673 A1 | 5/2011 | Bloch et al. |
| 2011/0173413 A1 | 7/2011 | Chen et al. |
| 2011/0219208 A1 | 9/2011 | Asaad |
| 2011/0238956 A1 | 9/2011 | Arimilli et al. |
| 2011/0258245 A1 | 10/2011 | Blocksome et al. |
| 2011/0276789 A1 | 11/2011 | Chambers et al. |
| 2012/0063436 A1 | 3/2012 | Thubert et al. |
| 2012/0117331 A1 | 5/2012 | Krause et al. |
| 2012/0131309 A1 | 5/2012 | Johnson |
| 2012/0254110 A1 | 10/2012 | Takemoto |
| 2012/0254344 A1 | 10/2012 | Archer et al. |
| 2013/0117548 A1 | 5/2013 | Grover et al. |
| 2013/0159410 A1 | 6/2013 | Lee et al. |
| 2013/0159568 A1 | 6/2013 | Shahar et al. |
| 2013/0215904 A1 | 8/2013 | Zhou et al. |
| 2013/0250756 A1 | 9/2013 | Johri et al. |
| 2013/0312011 A1 | 11/2013 | Kumar et al. |
| 2013/0318525 A1 | 11/2013 | Palanisamy et al. |
| 2013/0336292 A1 | 12/2013 | Kore et al. |
| 2014/0019574 A1 | 1/2014 | Cardona et al. |
| 2014/0033217 A1 | 1/2014 | Vajda et al. |
| 2014/0040542 A1 | 2/2014 | Kim et al. |
| 2014/0047341 A1 | 2/2014 | Breternitz et al. |

(56) References Cited

U.S. PATENT DOCUMENTS

| | | |
|---|---|---|
| 2014/0095779 A1 | 4/2014 | Forsyth et al. |
| 2014/0122831 A1 | 5/2014 | Uliel et al. |
| 2014/0136811 A1 | 5/2014 | Fleischer et al. |
| 2014/0189308 A1 | 7/2014 | Hughes et al. |
| 2014/0211804 A1 | 7/2014 | Makikeni et al. |
| 2014/0258438 A1 | 9/2014 | Ayoub |
| 2014/0280031 A1* | 9/2014 | Zhou ............... G06F 16/24542 707/718 |
| 2014/0280420 A1 | 9/2014 | Khan |
| 2014/0281370 A1 | 9/2014 | Khan |
| 2014/0282613 A1 | 9/2014 | Jea et al. |
| 2014/0362692 A1 | 12/2014 | Wu et al. |
| 2014/0365548 A1 | 12/2014 | Mortensen |
| 2015/0074373 A1 | 3/2015 | Sperber et al. |
| 2015/0106578 A1 | 4/2015 | Warfield et al. |
| 2015/0143076 A1 | 5/2015 | Khan |
| 2015/0143077 A1 | 5/2015 | Khan |
| 2015/0143078 A1 | 5/2015 | Khan et al. |
| 2015/0143079 A1 | 5/2015 | Khan |
| 2015/0143085 A1 | 5/2015 | Khan |
| 2015/0143086 A1 | 5/2015 | Khan |
| 2015/0154058 A1 | 6/2015 | Miwa et al. |
| 2015/0178211 A1 | 6/2015 | Hiramoto et al. |
| 2015/0180785 A1 | 6/2015 | Annamraju |
| 2015/0188987 A1 | 7/2015 | Reed et al. |
| 2015/0193271 A1 | 7/2015 | Archer et al. |
| 2015/0212972 A1 | 7/2015 | Boettcher et al. |
| 2015/0261720 A1 | 9/2015 | Kagan et al. |
| 2015/0269116 A1 | 9/2015 | Raikin et al. |
| 2015/0278347 A1 | 10/2015 | Meyer et al. |
| 2015/0347012 A1 | 12/2015 | Dewitt et al. |
| 2015/0365494 A1 | 12/2015 | Cardona et al. |
| 2015/0379022 A1 | 12/2015 | Puig et al. |
| 2016/0055225 A1 | 2/2016 | Xu et al. |
| 2016/0092362 A1 | 3/2016 | Barron et al. |
| 2016/0105494 A1 | 4/2016 | Reed et al. |
| 2016/0112531 A1 | 4/2016 | Milton et al. |
| 2016/0117277 A1 | 4/2016 | Raindel et al. |
| 2016/0119244 A1 | 4/2016 | Wang et al. |
| 2016/0179537 A1 | 6/2016 | Kunzman et al. |
| 2016/0219009 A1 | 7/2016 | French |
| 2016/0246646 A1 | 8/2016 | Craciunas et al. |
| 2016/0248656 A1 | 8/2016 | Anand et al. |
| 2016/0283422 A1 | 9/2016 | Crupnicoff et al. |
| 2016/0294793 A1 | 10/2016 | Larson et al. |
| 2016/0299872 A1 | 10/2016 | Vaidyanathan et al. |
| 2016/0342568 A1 | 11/2016 | Burchard et al. |
| 2016/0352598 A1 | 12/2016 | Reinhardt et al. |
| 2016/0364350 A1 | 12/2016 | Sanghi et al. |
| 2017/0063613 A1* | 3/2017 | Bloch .................. H04L 12/44 |
| 2017/0093715 A1 | 3/2017 | McGhee et al. |
| 2017/0116154 A1 | 4/2017 | Palmer et al. |
| 2017/0187496 A1 | 6/2017 | Shalev et al. |
| 2017/0187589 A1 | 6/2017 | Pope et al. |
| 2017/0187629 A1 | 6/2017 | Shalev et al. |
| 2017/0187846 A1 | 6/2017 | Shalev et al. |
| 2017/0192782 A1 | 7/2017 | Valentine et al. |
| 2017/0199844 A1 | 7/2017 | Burchard et al. |
| 2017/0262517 A1 | 9/2017 | Horowitz et al. |
| 2017/0308329 A1 | 10/2017 | A et al. |
| 2017/0344589 A1 | 11/2017 | Kafai et al. |
| 2018/0004530 A1 | 1/2018 | Vorbach |
| 2018/0046901 A1 | 2/2018 | Xie et al. |
| 2018/0047099 A1 | 2/2018 | Bonig et al. |
| 2018/0089278 A1 | 3/2018 | Bhattacharjee et al. |
| 2018/0091442 A1 | 3/2018 | Chen et al. |
| 2018/0097721 A1 | 4/2018 | Matsui et al. |
| 2018/0115529 A1 | 4/2018 | Munger et al. |
| 2018/0173673 A1 | 6/2018 | Daglis et al. |
| 2018/0262551 A1 | 9/2018 | Demeyer et al. |
| 2018/0278549 A1 | 9/2018 | Mula et al. |
| 2018/0285151 A1 | 10/2018 | Wang et al. |
| 2018/0285316 A1 | 10/2018 | Thorson et al. |
| 2018/0287725 A1 | 10/2018 | Rabinovich et al. |
| 2018/0287928 A1* | 10/2018 | Levi .................. H04L 45/16 |
| 2018/0302324 A1 | 10/2018 | Kasuya |
| 2018/0321912 A1 | 11/2018 | Li et al. |
| 2018/0321938 A1 | 11/2018 | Boswell et al. |
| 2018/0349212 A1 | 12/2018 | Liu et al. |
| 2018/0367465 A1 | 12/2018 | Levi |
| 2018/0375781 A1 | 12/2018 | Chen et al. |
| 2019/0018805 A1 | 1/2019 | Benisty |
| 2019/0026250 A1 | 1/2019 | Das Sarma et al. |
| 2019/0044827 A1 | 2/2019 | Ganapathi et al. |
| 2019/0044875 A1 | 2/2019 | Murty et al. |
| 2019/0044889 A1 | 2/2019 | Serres et al. |
| 2019/0065208 A1 | 2/2019 | Liu et al. |
| 2019/0068501 A1 | 2/2019 | Schneder et al. |
| 2019/0102090 A1 | 4/2019 | Guim et al. |
| 2019/0102179 A1 | 4/2019 | Fleming et al. |
| 2019/0102338 A1 | 4/2019 | Tang et al. |
| 2019/0102640 A1 | 4/2019 | Balasubramanian |
| 2019/0104057 A1* | 4/2019 | Goel ................. H04L 47/122 |
| 2019/0114533 A1 | 4/2019 | Ng et al. |
| 2019/0121388 A1 | 4/2019 | Knowles et al. |
| 2019/0138638 A1 | 5/2019 | Pal et al. |
| 2019/0141133 A1 | 5/2019 | Rajan et al. |
| 2019/0147092 A1 | 5/2019 | Pal et al. |
| 2019/0149486 A1 | 5/2019 | Bohrer et al. |
| 2019/0149488 A1 | 5/2019 | Bansal et al. |
| 2019/0171612 A1 | 6/2019 | Shahar et al. |
| 2019/0187774 A1 | 6/2019 | Yi et al. |
| 2019/0235866 A1 | 8/2019 | Das Sarma et al. |
| 2019/0278737 A1 | 9/2019 | Kozomora et al. |
| 2019/0303168 A1 | 10/2019 | Fleming, Jr. et al. |
| 2019/0303263 A1 | 10/2019 | Fleming, Jr. et al. |
| 2019/0324431 A1 | 10/2019 | Cella et al. |
| 2019/0339688 A1 | 11/2019 | Cella et al. |
| 2019/0347099 A1 | 11/2019 | Eapen et al. |
| 2019/0369994 A1 | 12/2019 | Parandeh Afshar et al. |
| 2019/0377580 A1 | 12/2019 | Vorbach |
| 2019/0379714 A1 | 12/2019 | Levi et al. |
| 2020/0005859 A1 | 1/2020 | Chen et al. |
| 2020/0034145 A1 | 1/2020 | Bainville et al. |
| 2020/0057748 A1 | 2/2020 | Danilak |
| 2020/0103894 A1 | 4/2020 | Cella et al. |
| 2020/0106828 A1 | 4/2020 | Elias et al. |
| 2020/0137013 A1 | 4/2020 | Jin et al. |
| 2020/0202246 A1 | 6/2020 | Lin et al. |
| 2020/0265043 A1 | 8/2020 | Graham et al. |
| 2020/0274733 A1 | 8/2020 | Graham et al. |
| 2021/0203621 A1 | 7/2021 | Ylisirnio et al. |
| 2021/0218808 A1 | 7/2021 | Graham et al. |
| 2021/0234753 A1* | 7/2021 | Ben-Moshe ......... H04L 69/324 |
| 2022/0006606 A1 | 1/2022 | Levi et al. |
| 2022/0029854 A1 | 1/2022 | Graham et al. |
| 2022/0078043 A1 | 3/2022 | Marcovitch et al. |
| 2022/0188147 A1 | 6/2022 | Nudelman et al. |
| 2022/0201103 A1 | 6/2022 | Keppel et al. |
| 2023/0089099 A1 | 3/2023 | Nudelman et al. |
| 2023/0292149 A1 | 9/2023 | Wu et al. |
| 2023/0401116 A1 | 12/2023 | Hans et al. |
| 2025/0193310 A1 | 6/2025 | Xie et al. |

FOREIGN PATENT DOCUMENTS

| | | |
|---|---|---|
| WO | 03044677 A1 | 5/2003 |
| WO | 2016150833 A1 | 9/2016 |
| WO | 2016167915 A1 | 10/2016 |

OTHER PUBLICATIONS

NVIDIA Corporation, "NVIDIA Scalable Hierarchical Aggregation and Reduction Protocol (SHARP)," Rev. 3.0.0, pp. 1-3, year 2023.
Graham, U.S. Appl. No. 18/074,563, filed Dec. 5, 2022.
Graham, U.S. Appl. No. 18/105,846, filed Feb. 5, 2023.
Graham, U.S. Appl. No. 63/356,923, filed Jun. 29, 2022.
CN Application # 202110742521.4 Office Action dated Jan. 30, 2024.
Mellanox Technologies, "InfiniScale IV: 36-port 40GB/s Infiniband Switch Device", pp. 1-2, year 2009.
Mellanox Technologies Inc., "Scaling 10Gb/s Clustering at Wire-Speed", pp. 1-8, year 2006.

(56) References Cited

OTHER PUBLICATIONS

IEEE 802.1D Standard "IEEE Standard for Local and Metropolitan Area Networks—Media Access Control (MAC) Bridges", IEEE Computer Society, pp. 1-281, Jun. 9, 2004.
IEEE 802.1AX Standard "IEEE Standard for Local and Metropolitan Area Networks—Link Aggregation", IEEE Computer Society, pp. 1-163, Nov. 3, 2008.
Turner et al., "Multirate Clos Networks", IEEE Communications Magazine, pp. 1-11, Oct. 2003.
Thayer School of Engineering, "An Slightly Edited Local Copy of Elements of Lectures 4 and 5", Dartmouth College, pp. 1-5, Jan. 15, 1998 http://people.seas.harvard.edu/~jones/cscie129/nu_lectures/lecture11/switching/clos_network/clos_network.html.
"MPI: A Message-Passing Interface Standard," Message Passing Interface Forum, version 3.1, pp. 1-868, Jun. 4, 2015.
Coti et al., "MPI Applications on Grids: a Topology Aware Approach," Proceedings of the 15th International European Conference on Parallel and Distributed Computing (EuroPar'09), pp. 1-12, Aug. 2009.
Petrini et al., "The Quadrics Network (QsNet): High-Performance Clustering Technology," Proceedings of the 9th IEEE Symposium on Hot Interconnects (HotI'01), pp. 1-6, Aug. 2001.
Sancho et al., "Efficient Offloading of Collective Communications in Large-Scale Systems," Proceedings of the 2007 IEEE International Conference on Cluster Computing, pp. 1-10, Sep. 17-20, 2007.
Priest et al., "You've Got Mail (YGM): Building Missing Asynchronous Communication Primitives", IEEE International Parallel and Distributed Processing Symposium Workshops, pp. 221-230, year 2019.
InfiniBand Architecture Specification, vol. 1, Release 1.2.1, pp. 1-1727, Nov. 2007.
Deming, "Infiniband Architectural Overview", Storage Developer Conference, pp. 1-70, year 2013.
Fugger et al., "Reconciling fault-tolerant distributed computing and systems-on-chip", Distributed Computing, vol. 24, Issue 6, pp. 323-355, Jan. 2012.
Wikipedia, "System on a chip", pp. 1-4, Jul. 6, 2018.
Villavieja et al., "On-chip Distributed Shared Memory", Computer Architecture Department, pp. 1-10, Feb. 3, 2011.
Wikipedia, "Nagle's algorithm", pp. 1-4, Dec. 12, 2019.
Bruck et al., "Efficient Algorithms for All-to-All Communications in Multiport Message-Passing Systems", IEEE Transactions on Parallel and Distributed Systems, vol. 8, No. 11, pp. 1143-1156, Nov. 1997.
Gainaru et al., "Using InfiniBand Hardware Gather-Scatter Capabilities to Optimize MPI All-to-All", EuroMPI '16, Edinburgh, United Kingdom, pp. 1-13, year 2016.
Pjesivac-Grbovic et al., "Performance analysis of MPI collective operations", Cluster Computing, pp. 1-25, year 2007.
Bruck et al., "Efficient Algorithms for All-to-All Communications in Multiport Message-Passing Systems", Proceedings of the sixth annual ACM symposium on Parallel algorithms and architectures, pp. 298-309, Aug. 1, 1994.
Chiang et al., "Toward supporting data parallel programming on clusters of symmetric multiprocessors", Proceedings International Conference on Parallel and Distributed Systems, pp. 607-614, Dec. 14, 1998.
Danalis et al., "PTG: an abstraction for unhindered parallelism", 2014 Fourth International Workshop on Domain-Specific Languages and High-Level Frameworks for High Performance Computing, pp. 1-10, Nov. 17, 2014.
Cosnard et al., "Symbolic Scheduling of Parameterized Task Graphs on Parallel Machines," Combinatorial Optimization book series (COOP, vol. 7), pp. 217-243, year 2000.
Jeannot et al., "Automatic Multithreaded Parallel Program Generation for Message Passing Multiprocessors using paramerized Task Graphs", World Scientific, pp. 1-8, Jul. 23, 2001.
Stone, "An Efficient Parallel Algorithm for the Solution of a Tridiagonal Linear System of Equations," Journal of the Association for Computing Machinery, vol. 10, No. 1, pp. 27-38, Jan. 1973.
Kogge et al., "A Parallel Algorithm for the Efficient Solution of a General Class of Recurrence Equations," IEEE Transactions on Computers, vol. C-22, No. 8, pp. 786-793, Aug. 1973.
Hoefler et al., "Message Progression in Parallel Computing—To Thread or not to Thread?", 2008 IEEE International Conference on Cluster Computing, pp. 1-10, Tsukuba, Japan, Sep. 29-Oct. 1, 2008.
Wikipedia, "Loop unrolling," pp. 1-9, last edited Sep. 9, 2020 downloaded from https://en.wikipedia.org/wiki/Loop_unrolling.
Chapman et al., "Introducing OpenSHMEM: SHMEM for the PGAS Community," Proceedings of the Forth Conferene on Partitioned Global Address Space Programming Model, pp. 1-4, Oct. 2010.
Yang et al., "SwitchAgg: A Further Step Toward In-Network Computing," 2019 IEEE International Conference on Parallel & Distributed Processing with Applications, Big Data & Cloud Computing, Sustainable Computing & Communications, Social Computing & Networking, pp. 36-45, Dec. 2019.
Pacheco, "A User's Guide to MPI," Department of Mathematics, University of San Francisco, CA, USA, pp. 1-51, Mar. 30, 1998.
Wikipedia, "Message Passing Interface," pp. 1-16, last edited Nov. 7, 2021, as downloaded from https://en.wikipedia.org/wiki/Message_Passing_Interface.
"Message Passing Interface (MPI): History and Evolution," Virtual Workshop, Cornell University Center for Advanced Computing, Ny, USA, pp. 1-2, year 2021, as downloaded from https://cvw.cac.cornell.edu/mpi/history.

\* cited by examiner

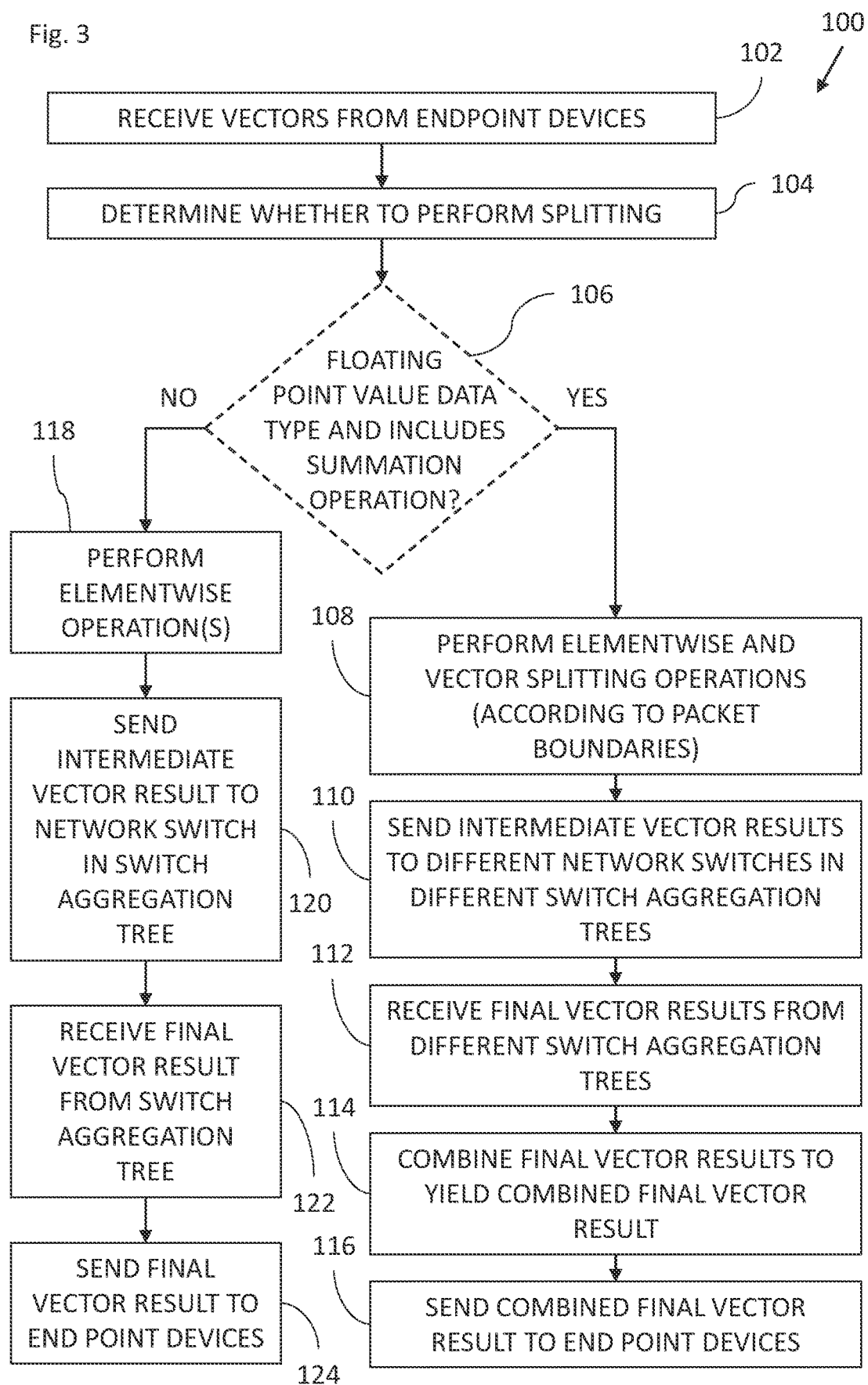

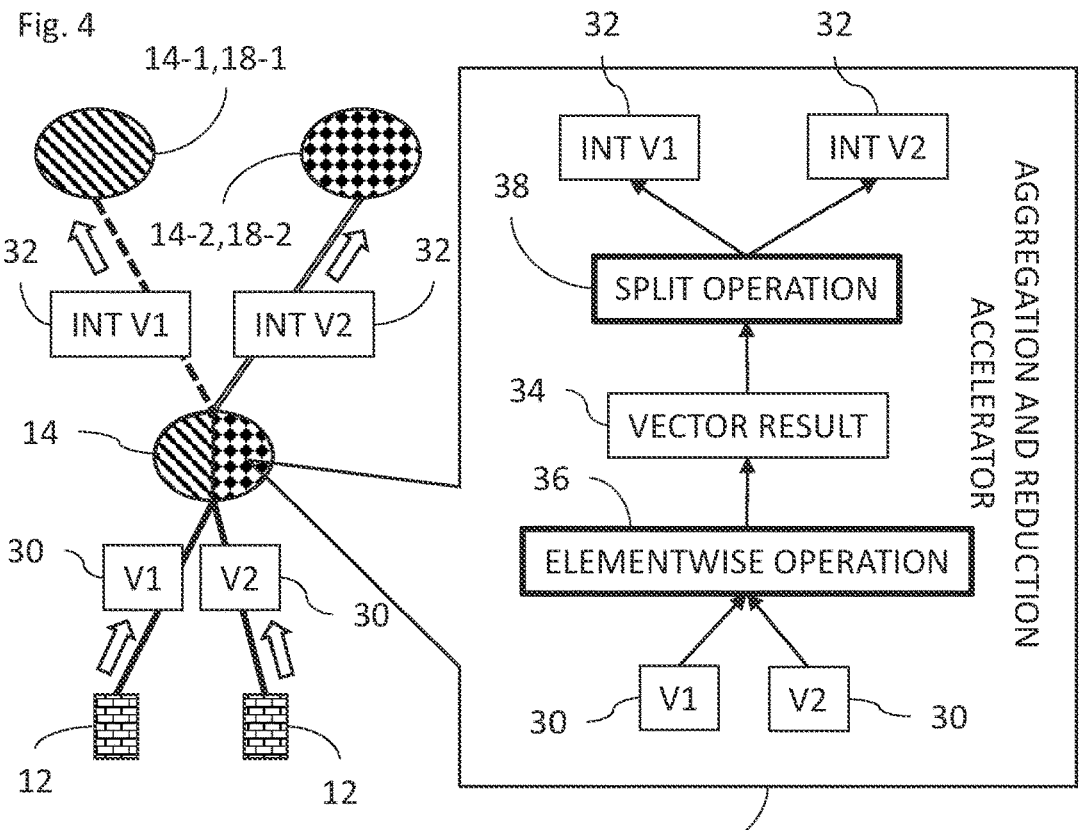
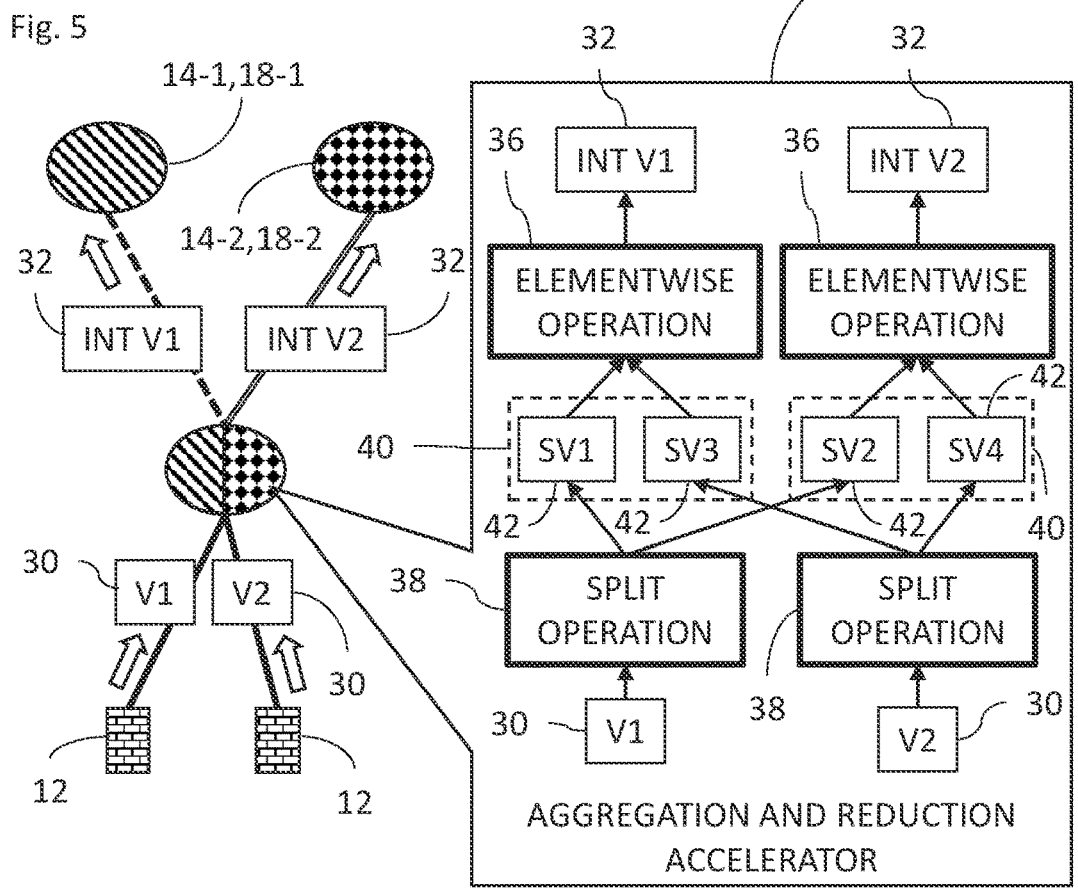

ID OF THE INVENTION

The present invention relates to computer systems, and in particular, but not exclusively to, in-network compute operations.

BACKGROUND

A network node (e.g., including any suitable element(s) such as a graphics processing unit (GPU) and/or a central processing unit (CPU)) may initiate a parallel computing job with other GPUs across a network. In addition to the other GPUs participating in the parallel computing job, compute-resources in switches in the network may also participate in the parallel computing job by providing the various GPUs with the necessary data to perform the parallel computing job and also by performing such tasks as addition. The switches may perform reduction processing (e.g., summing two vectors together) and aggregation of data received from other network switches and/or GPUs.

For example, in-network resources may perform reduction operations with vectors including elementwise vector operations such as vector summation. The vectors may originate in endpoint devices and the object of the reduction operation may be to perform a vector operation (e.g., sum) on all the vectors. For example, if endpoint 1 has vector 1, endpoint 2 has vector 2, and so on, and endpoint N has vector N, then the object of the reduction operation may be to sum vectors 1 to N. At each switch, an in-network compute resource aggregates received vectors and provides the aggregated result to another switch in the direction of a root of a reduction tree. This is repeated at each switch in each layer of the tree until the root of the tree computes the sum of vectors 1 to N based on the vectors it receives from other switches below the root switch. The vector result is then propagated down the tree to the endpoint devices until the relevant (e.g., each) endpoint device receives the sum of vectors 1 to N.

An example of aggregation and reduction is provided in U.S. Pat. No. 10,284,383 to Bloch, et al., which describes a switch in a data network configured to mediate data exchanges among network elements.

SUMMARY

There is provided in accordance with an embodiment of the present disclosure, a network switch device, including a network interface to receive vectors from endpoint devices as part of an aggregation and reduction process, and an aggregation and reduction accelerator to perform elementwise and vector splitting operations with the received vectors as input yielding at least two intermediate vector results, including a first intermediate vector result and a second intermediate vector result, wherein the network interface is configured to send the at least two intermediate vector results to different corresponding network switches in different switch aggregation trees including sending the first intermediate vector result to a first network switch in a first switch aggregation tree and the second intermediate vector result to a second network switch in a second switch aggregation tree, receive at least two final vector results of the aggregation and reduction process from the different switch aggregation trees including receiving a first final vector result from the first network switch and a second final vector result from the second network switch, and combine the at least two final vector results to yield a combined final vector result, wherein the network interface is configured to send the combined final vector result to the endpoint devices.

Further in accordance with an embodiment of the present disclosure the aggregation and reduction accelerator is configured to split the received vectors yielding at least two groups of split vectors, and perform elementwise operations on the split vectors the at least two groups yielding the at least two intermediate vector results for the at least two groups, respectively.

Still further in accordance with an embodiment of the present disclosure the aggregation and reduction accelerator is configured to perform elementwise operations on the received vectors yielding a given vector result, and split the given vector result yielding the at least two intermediate vector results.

Additionally in accordance with an embodiment of the present disclosure the aggregation and reduction accelerator is configured to perform elementwise operations with the received vectors as input, the elementwise operations being selected from any one or more of the following summation, point wise minimum, point wise maximum, bitwise OR, bitwise NOR, bitwise XOR, maximum value with index, minimum value with index, and a logical operation.

Moreover, in accordance with an embodiment of the present disclosure the aggregation and reduction accelerator is configured to perform elementwise summation with the received vectors as input, the received vectors having a floating-point value data type.

Further in accordance with an embodiment of the present disclosure the network interface is configured to receive the vectors from the endpoint devices in aggregation and reduction protocol packets, and the aggregation and reduction accelerator is configured to perform vector splitting packet boundaries.

Still further in accordance with an embodiment of the present disclosure the aggregation and reduction accelerator is configured to selectively perform elementwise operations with vector splitting for first received vectors and selectively perform elementwise operations without performing vector splitting for second received vectors.

Additionally in accordance with an embodiment of the present disclosure the aggregation and reduction accelerator is configured to determine to selectively perform elementwise operations with vector splitting for first received vectors based on the first received vectors having a floating-point value data type, and the elementwise operations including summation.

Moreover, in accordance with an embodiment of the present disclosure the aggregation and reduction accelerator is configured to determine to selectively perform elementwise operations without vector splitting for second received vectors based on either the second received vectors not having a floating-point value data type, or the elementwise operations not including summation.

Further in accordance with an embodiment of the present disclosure the aggregation and reduction accelerator, responsively to an administrator decision, is configured to selectively perform elementwise operations with vector splitting for first received vectors and selectively perform elementwise operations without performing vector splitting for second received vectors.

Still further in accordance with an embodiment of the present disclosure the aggregation and reduction accelerator, responsively to an aggregation manager decision based on a topology of the network, is configured to selectively perform elementwise operations with vector splitting for first received vectors and selectively perform elementwise operations without performing vector splitting for second received vectors.

There is also provided in accordance with another embodiment of the present disclosure, a networking method, including receiving vectors from endpoint devices as part of an aggregation and reduction process, performing elementwise and vector splitting operations with the received vectors as input yielding at least two intermediate vector results, including a first intermediate vector result and a second intermediate vector result, sending the at least two intermediate vector results to different corresponding network switches in different switch aggregation trees including sending the first intermediate vector result to a first network switch in a first switch aggregation tree and the second intermediate vector result to a second network switch in a second switch aggregation tree, receiving at least two final vector results of the aggregation and reduction process from the different switch aggregation trees including receiving a first final vector result from the first network switch and a second final vector result from the second network switch, combining the at least two final vector results to yield a combined final vector result, and sending the combined final vector result to the endpoint devices.

Additionally in accordance with an embodiment of the present disclosure, the method includes splitting the received vectors yielding at least two groups of split vectors, and performing elementwise operations on the split vectors the at least two groups yielding the at least two intermediate vector results for the at least two groups, respectively.

Moreover, in accordance with an embodiment of the present disclosure, the method includes performing elementwise operations on the received vectors yielding a given vector result, and splitting the given vector result yielding the at least two intermediate vector results.

Further in accordance with an embodiment of the present disclosure, the method includes performing elementwise operations with the received vectors as input, the elementwise operations being selected from any one or more of the following summation, point wise minimum, point wise maximum, bitwise OR, bitwise NOR, bitwise XOR, maximum value with index, minimum value with index, and a logical operation.

Still further in accordance with an embodiment of the present disclosure, the method includes performing elementwise summation with the received vectors as input, the received vectors having a floating-point value data type.

Additionally in accordance with an embodiment of the present disclosure the receiving vectors from endpoint devices includes receiving the vectors from the endpoint devices in aggregation and reduction protocol packets, and the performing includes performing vector splitting packet boundaries.

Moreover, in accordance with an embodiment of the present disclosure, the method includes selectively performing elementwise operations with vector splitting for first received vectors, and selectively performing elementwise operations without performing vector splitting for second received vectors.

Further in accordance with an embodiment of the present disclosure, the method includes determining to selectively perform elementwise operations with vector splitting for first received vectors based on the first received vectors having a floating-point value data type, and the elementwise operations including summation.

Still further in accordance with an embodiment of the present disclosure, the method includes determining to selectively perform elementwise operations without vector splitting for second received vectors based on either the second received vectors not having a floating-point value data type, or the elementwise operations not including summation.

Additionally in accordance with an embodiment of the present disclosure, the method includes, responsively to an administrator decision selectively performing elementwise operations with vector splitting for first received vectors, and selectively performing elementwise operations without performing vector splitting for second received vectors.

Moreover, in accordance with an embodiment of the present disclosure, the method includes, responsively to an aggregation manager decision based on a topology of the network selectively performing elementwise operations with vector splitting for first received vectors, and selectively performing elementwise operations without performing vector splitting for second received vectors.

There is also provided in accordance with still another embodiment of the present disclosure, a system, including a plurality of network switches including different switch aggregation trees of the network switches having a leaf layer of the network switches, wherein each of the network switches in the leaf layer is configured to receive vectors from respective endpoint devices as part of an aggregation and reduction process, perform elementwise and vector splitting operations with the received vectors as input yielding intermediate vector results, and send different ones of the intermediate vector results to the network switches in the different switch aggregation trees, the network switches in the different switch aggregation trees are to perform at least part of the aggregation and reduction process yielding different final vector results and provide the different final vector results to the network switches in the leaf layer, and each of the network switches in the leaf layer is configured to receive the different final vector results from the different switch aggregation trees, combine the different final vector results to yield a combined final vector result, and send the combined final vector result to the respective endpoint devices.

BRIEF DESCRIPTION OF THE DRAWINGS

The present invention will be understood from the following detailed description, taken in conjunction with the drawings in which:

FIG. 3 is a flowchart including steps in a method of operation of the system of FIG. 1;

FIG. 4 is a block diagram view illustrating one method of elementwise and splitting operations in the system of FIG. 1;

FIG. 5 is a block diagram view illustrating another method of elementwise and splitting operations in the system of FIG. 1;

DESCRIPTION OF EXAMPLE EMBODIMENTS

Overview

Figure 1:
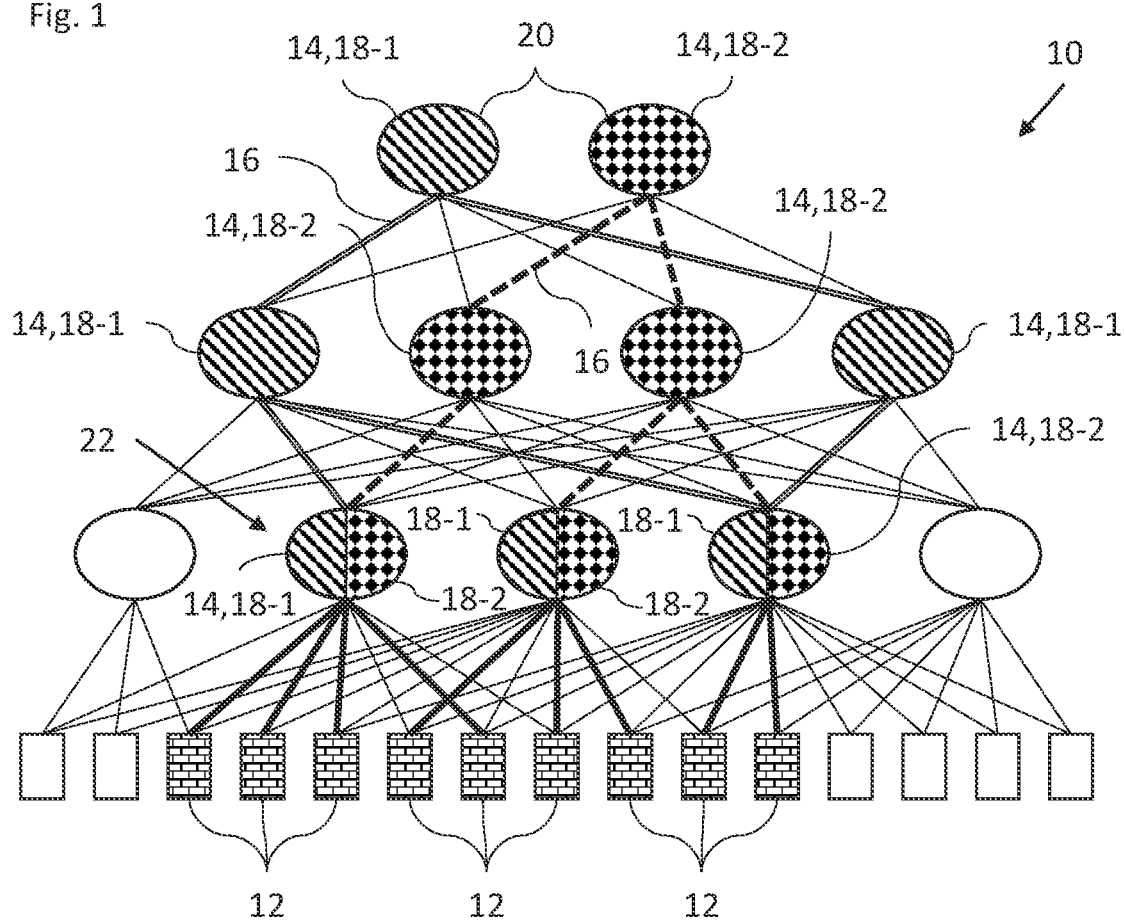
FIG. 1 is a block diagram view of multi-tree aggregation and reduction system constructed and operative in accordance with an embodiment of the present invention.

The performance of in-network compute operations may be degraded due to physical limitations of the network depending on its structure and the operation requirements. It may be possible to overcome these limitations by modifying the way applications running on endpoint devices utilize in-network compute resources, but such physical limitations may only apply to certain regions of the network. Furthermore, in many cases (e.g., cloud computing), the system operator does not wish to expose certain information to the user application (e.g., the network topology). However, it is extremely challenging for the user application to modify its usage of the in-network compute resources to avoid overstressing a sensitive portion of the network topology when the user application is not informed of the relevant issue(s).

The following are examples of issues which may affect in-network compute operations and the aggregation and reduction process.

If the vectors to be processed are very large and a small number of network links are being used, then the network links are bombarded, creating a localized hotspot of contention within the network which may be undesirable.

In the SHArP aggregation and reduction protocol there is a requirement to reserve a receive buffer and send buffer in order to maintain reliability of transmission. The size of the buffer is proportional to latency of the link multiplied by the proportion of bandwidth. In some cases, if cables are too long (leading to higher latency) SHArP may be degraded, potentially even to the point where its functionality is limited or that it would confer no benefit.

Sometimes the data type (float data type, double data type, FP16, FP32, FP64) used by the end points is not the same as used by the switches. This is a particular issue with floating point operations. Data type refers to the number of bits used to represent a number. It is very common that end points use 16 bits to represent a single number, while switches use 32 bits to represent values belonging to intermediate computational steps even though the original values are in 16 bits. This may be done in order to limit the accumulation of numerical errors. Therefore, every one bit that the end points send over the network is transformed into two bits by the switches. If the endpoints are operating at full line rate, then the network needs to operate at double the line rate to keep up, and this is not always feasible.

Embodiments of the present invention address at least some of the above drawbacks by providing an aggregation and reduction system in which vector operations are divided among (two or more) different aggregation and reduction trees of switches.

In some embodiments networks switches in the leaf layer of the trees receive vectors from respective endpoint devices. For example, switch 1 receives vectors 1-3 from endpoints 1-3, switch 2 receives vectors 4-5 from endpoints 4-5, and so on. Each of the network switches in the leaf layer performs elementwise and vector splitting operations to yield intermediate vector results. In some cases, elementwise operations (e.g., summation) are performed prior to vector splitting. For example, switch 1 may perform elementwise vector operations on vectors 1-3 received from endpoints 1-3 to yield a vector result which is then split into two intermediate vector results. In other cases, vector splitting is performed prior to elementwise operations. In some embodiments, switch 1 may first split vectors 1-3 received from endpoints 1-3 to yield two groups of split vectors and then perform elementwise vector operations on each group of split vectors to yield two intermediate vector results.

An elementwise operation on two or more vectors performs the operations on the elements of the vectors independent of the other elements of the vectors. For example, the summation of vector A having elements a1, a2, and a3 with vector B having elements b1, b2, and b3 is given by a1+b1, a2+b2, and a3+b3.

Each network switch in the leaf layer then sends different intermediate vector results to the different aggregation and reduction trees for further processing. Switch 1 then sends one of the intermediate vector results to a switch in one of the aggregation and reduction trees and the other intermediate vector result to a switch in the other aggregation and reduction tree.

The vectors are processed by the switches in the different aggregation and reduction trees and passed up successive levels of the trees until all the vectors are reduced to a single final vector result in the root switch of each of the trees. The final vector results are then propagated down each of the trees until the final vector results are received by the switches in the leaf layer. The switches in the leaf layer then combine the received final vector results to yield a combined final vector result which is provided back to the respective endpoint devices. For example, final vector results 1 and 2 are propagated from the root switch of each respective tree (i.e., final vector result 1 is propagated from the root switch of tree 1, final vector result 2 is propagated from the root switch of tree 2) down to switch 1, which combines final vector results 1 and 2 to yield a combined final vector result, which switch 1 provides to endpoint device 1-3. The above examples refer to two aggregation and reduction trees. Embodiments of the present invention may include any suitable number of aggregation and reduction trees.

As the vector operations are performed elementwise, the vectors can be split in two or more sub-vectors (depending on the number of aggregation and reduction trees), processed by the switches in the different trees and then combined (e.g., concatenated) by the switches in the leaf layer to provide the same final vector result that would have been computed by switches in a single aggregation and reduction tree. In some embodiments, the splitting operations are based on the packet enumeration of the various vectors so that vectors are split according to packet boundaries so that all vectors are split identically at all regions of the network without requiring additional synchronization. In other embodiments, the vectors may be split according to any suitable method.

As the vectors are split (and recombined) in the switches and not in the endpoint devices, the splitting and recombination operation is transparent to the user applications running in the endpoint devices and therefore does not need the endpoint devices to have knowledge of the network topology.

In some embodiments, splitting the vectors and using more than one aggregation and reduction tree to process the split vectors may be selectively applied and may depend on various factors such as: a network administrator enforces splitting based on network congestion; a combination of data type and operation type (e.g., summation of any floating point value) may indicate splitting vectors, whereas other data types and operation types (e.g. computing minimum or maximum of floating point values, or summation of integers) may not indicate splitting vectors; based on a decision of an aggregation manager (e.g., an entity which, constructs switch trees and knows that the trees include long links and therefore to compensate for long links decides that the vectors should be split).

Using SHARP when the buffer requirements cannot be fully satisfied may result in a situation where SHArP is technically functional, but its performance is degraded. Under some circumstances, the performance degradation may be so great that the performance benefits of using SHARP are entirely negated or may result in worse performance. By splitting vectors, buffer requirements are reduced (e.g., halved) and may allow SHARP to be used without the abovementioned performance degradation. Vector splitting may lead to lower traffic on network links. Vector splitting may also eliminate the problem caused by doubling data representation size due to different data types, described above. Embodiments of the present invention improve the way a computer or other processing device works by providing better computer performance, providing higher processing speed, and providing less latency, among other improvements.

SYSTEM DESCRIPTION

Reference is now made to FIG. 1, which is a block diagram view of multi-tree aggregation and reduction system 10 constructed and operative in accordance with an embodiment of the present invention. The system 10 includes endpoint devices 12 and network switches 14 (only some labeled for the sake of simplicity) arranged in a topology with network links 16 (only some labeled for the sake of simplicity) connecting the switches 14. FIG. 1 shows two aggregation and reduction trees 18 (18-1 and 18-2) of switches 14. The aggregation and reduction trees 18 are also referred to herein as switch aggregation trees. Each aggregation and reduction tree 18 includes a root 20 and a leaf layer 22. The leaf layer 22 includes switches 14 which may be included in both aggregation and reduction trees 18 (as shown in FIG. 1).

The switches 14 of aggregation and reduction tree 18-1 are shown with a stripped diagonal fill, while the switches 14 of the other aggregation and reduction tree 18-2 are shown with a checkered fill. The switches 14 in the leaf layer 22 are shown with a striped diagonal fill section and a checkered fill section as the switches 14 in the leaf layer 22 of FIG. 1 are included in both aggregation and reduction trees 18. The network links 16 between the switches 14 of aggregation and reduction tree 18-1 are shown with compound lines, and the network links 16 between the switches 14 of the aggregation and reduction tree 18-2 are shown with dashed lines.

The aggregation and reduction trees 18 of FIG. 1 include 3 layers. The aggregation and reduction trees 18 may include any suitable number of layers, any suitable number of switches 14, and may span any suitable number of endpoint devices 12. The aggregation and reduction trees 18 may span hundreds or thousands of endpoint devices 12, for example. FIG. 1 shows two aggregation and reduction trees 18. Three or more aggregation and reduction trees 18 may also be used to perform a single aggregation and reduction process. An even number of aggregation and reduction trees 18 may be more convenient than an odd number of aggregation and reduction trees 18.

Each network switch 14 in the leaf layer 22 is configured to receive vectors from respective endpoint devices 12 as part of an aggregation and reduction process. Each network switch 14 in the leaf layer 22 is configured to perform elementwise and vector splitting operations with the received vectors as input yielding intermediate vector results. In some cases, elementwise operations (e.g., summation) are performed prior to vector splitting as described in more detail with reference to FIG. 4. In other cases, vector splitting is performed prior to elementwise operations as described in more detail with reference to FIG. 5.

Each network switch 14 in the leaf layer 22 is configured to send different intermediate vector results to the network switches 14 in the different switch aggregation trees 18. For example, one of the intermediate vector results is provided to aggregation and reduction tree 18-1 and another intermediate vector result is provided to aggregation and reduction tree 18-2.

The switches 14 in the different switch aggregation trees 18 are configured to perform at least part of the aggregation and reduction process yielding different final vector results and provide the different final vector results to the network switches 14 in the leaf layer 22. In particular, the intermediate vectors results are processed by the switches 14 in the different aggregation and reduction trees 18 and passed up successive levels of the trees 18 until all the vectors are reduced to a single final vector result in the root switch 20 of each of the trees 18. The final vector results are then propagated down each of the trees 18 until the final vector results are received by the switches 14 in the leaf layer 22.

Each network switch 14 in the leaf layer 22 is configured to receive the different final vector results from the different switch aggregation trees 18 and combine the different final vector results to yield a combined final vector result. Each network switch 14 in the leaf layer 22 is configured to send the combined final vector result to the respective endpoint devices 12.

As the vector operations are performed elementwise, the vectors can be split into two or more sub-vectors (depending on the number of aggregation and reduction trees), processed by the switches 14 in the different trees 18 and then combined (e.g., concatenated) by the switches 14 in the leaf layer 22 to provide the same final vector result that would have been computed by switches in a single aggregation and reduction tree.

Figure 2:
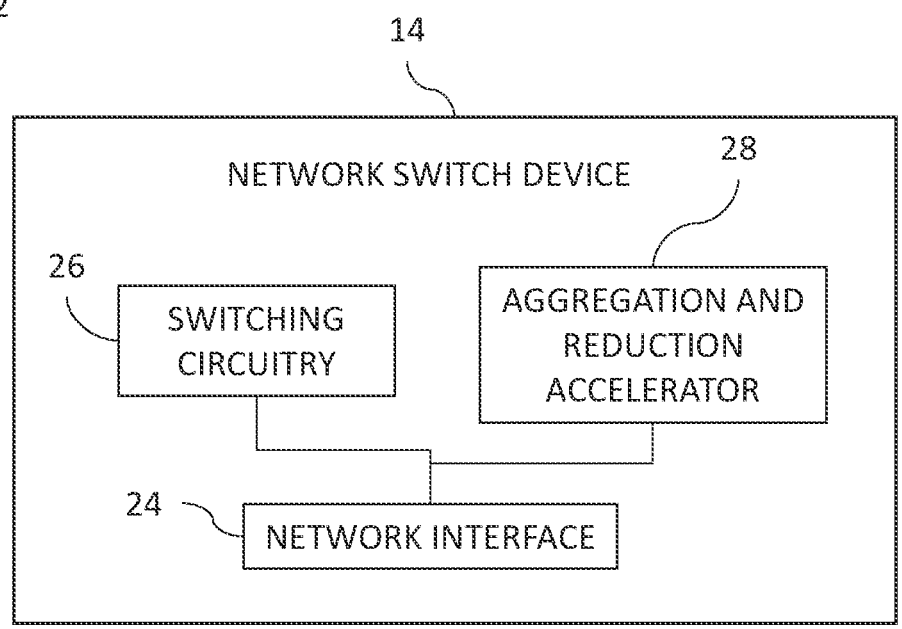
FIG. 2 is a block diagram view of one of the network switch devices in the system of FIG. 1.

Reference is now made to FIG. 2, which is a block diagram view of one of the network switch devices 14 in the system 10 of FIG. 1. The switch 14 includes a network interface 24 including ports (not shown) configured to receive packets from, and send packets to, other switches 14 and optionally from the endpoint devices 12 (if connected directly to one or more of the endpoint devices 12). The packets may include aggregation and reduction protocol packets. A vector may be comprised in multiple aggregation and reduction protocol packets.

The switch 14 also includes switching circuitry 26 to provide appropriate connections between ports of received packets and ports of packets to be sent. The switch 14 also includes an aggregation and reduction accelerator 28 to perform elementwise and vector splitting operations with received vectors as input. The aggregation and reduction accelerator 28 is described in more detail with reference to FIGS. 3-6.

In practice, some, or all of the functions of the aggregation and reduction accelerator 28 may be combined in a single physical component or, alternatively, implemented using multiple physical components. These physical components may comprise hard-wired or programmable devices, or a combination of the two. In some embodiments, at least some of the functions of the aggregation and reduction accelerator 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 3, which is a flowchart 100 including steps in a method of operation of the system 10 of FIG. 1. FIG. 3 describes processing inside one of the switches 14 in the leaf layer 22. The network interface 24 of the switch 14 is configured to receive vectors from endpoint devices 12 as part of an aggregation and reduction process (block 102). The endpoint devices 12 from which the network interface 24 receives vectors may be defined by the aggregation and reduction process and may include all, or a subset of, the endpoint devices 12 directly connected to the switch 14. In some embodiments, the network interface 24 is configured to receive vectors from the endpoint devices 12 in aggregation and reduction protocol packets. The network interface 24 is generally configured to receive one or more vectors from each of the endpoint devices 12 as part of an aggregation and reduction process. Each vector is generally carried in more than one packet so that when the vector is split in the switch 14 or a vector result is split in the switch 14, the split is according to packet boundaries, as described in more detail below with reference to FIG. 5.

In some embodiments, all received vectors are split by the switches 14 in the leaf layer 22 and the split vectors are processed by different aggregation and reduction trees 18. In some embodiments, splitting the vectors and using more than one aggregation and reduction tree 18 to process the split vectors may be selectively applied and may depend on various factors so that in some case vectors are not split and only one aggregation and reduction tree 18 is used to process the vectors.

The factors that may be considered to determine whether or not to selectively split received vectors and use more than one aggregation and reduction tree 18 include factors such as: a network administrator may enforce splitting based on network congestion; a combination of data type and operation type (e.g., summation of any floating point value) may indicate splitting vectors, whereas other data types and operation types (e.g. computing minimum or maximum of floating point values, or summation of integers) may not indicate splitting vectors; based on a decision of an aggregation manager (e.g., an entity which, constructs switch trees and knows that the trees include long links and therefore to compensate for long links decides that the vectors should be split). Therefore, in some embodiments, the aggregation and reduction accelerator 28 is configured to determine whether to perform splitting (block 104).

In some embodiments, the aggregation and reduction accelerator 28 is to selectively perform elementwise operations with vector splitting for some received vectors (described with reference to FIGS. 4-6 and the steps of blocks 108-116 of FIG. 3) and selectively perform elementwise operations without performing vector splitting for other received vectors (described with reference to FIG. 7 and the steps of blocks 118-124 of FIG. 3).

One of the factors mentioned above is data type and operation type. Therefore, in some embodiments, at a decision block 106, the aggregation and reduction accelerator 28 is configured to: determine to selectively perform elementwise operations with vector splitting for received vectors based on the received vectors having a floating-point value data type and the elementwise operations including summation; and determine to selectively perform elementwise operations without vector splitting for other received vectors based on either the other received vectors not having a floating-point value data type or the elementwise operations not including summation.

In some embodiments, the aggregation and reduction accelerator 28, responsively to an administrator decision, is configured to selectively perform elementwise operations with vector splitting for some received vectors, and selectively perform elementwise operations without performing vector splitting for other received vectors. In some embodiments, the aggregation and reduction accelerator 28, responsively to an aggregation manager decision based on a topology of the network, is configured to selectively perform elementwise operations with vector splitting for some received vectors, and selectively perform elementwise operations without performing vector splitting for other received vectors. In some embodiments, the aggregation manager decision may determine that all received vectors are subject to elementwise operations with vector splitting.

Reference is now made to FIG. 4, which is a block diagram view illustrating one method of elementwise and splitting operations in the system 10 of FIG. 1. Reference is also made to FIG. 3. In general, the aggregation and reduction accelerator 28 of the switch 14 in the leaf layer 22 is configured to perform elementwise and vector splitting operations with received vectors 30 (e.g., V1 and V2) as input yielding at least two intermediate vector results 32 including a first intermediate vector result (e.g., INT V1) and a second intermediate vector result (e.g., INT V2) (block 108).

In some cases, elementwise operations (e.g., summation) are performed prior to vector splitting, as described in more detail below with reference to FIG. 4. In other cases, vector splitting is performed prior to elementwise operations, as described in more detail below with reference to FIG. 5.

The aggregation and reduction accelerator 28 is configured to perform elementwise operations (block 36) on the received vectors 30 yielding a given vector result 34. In one example, the aggregation and reduction accelerator 28 is configured to perform elementwise summation with the received vectors as input, wherein the received vectors have a floating-point value data type. The elementwise operations may be selected from any one or more of the following: summation; point wise minimum; point wise maximum; bitwise OR, bitwise NOR, bitwise XOR, maximum value with index, minimum value with index, and a logical operation.

The aggregation and reduction accelerator 28 is configured to split (block 38) the given vector result 34 yielding the intermediate vector results 32 (e.g., INV V1 and INV V2). In some embodiments, the aggregation and reduction accelerator 28 is to perform vector splitting of the vector result 34 according to packet boundaries defined by the packets carrying the received vectors 30. In other embodiments, the splitting of the vector result 34 may be performed according to any suitable method.

The network interface 24 of switch 14 is configured to send the intermediate vector results 32 to different corresponding network switches 14 in different switch aggregation trees 18 (block 110) including sending the first intermediate vector result (e.g., INT V1) to network switch 14-1 in the aggregation and reduction tree 18-1 and the second intermediate vector result (e.g., INT V2) to network switch 14-2 in aggregation and reduction trees 18-2.

Reference is now made to FIG. 5, which is a block diagram view illustrating another method of elementwise and splitting operations in the system of FIG. 1. The aggregation and reduction accelerator 28 of the switch 14 in the leaf layer 22 is configured to split (blocks 38) the received vectors 30 yielding at least two groups 40 of split vectors 42 (e.g., SV1, SV2, SV3, SV4). In the example of FIG. 5, V1 is split into SV1 and SV2, and V2 is split into SV3 and SV4. One of the groups 40 of the split vectors 42 includes SV1 and SV3, while another one of the groups 40 of the split vectors 42 includes SV2 and SV4.

In some embodiments, the aggregation and reduction accelerator 28 of the switch 14 in the leaf layer 22 is configured to perform the vector splitting according to packet boundaries of received vectors 30 (e.g., V1 and V2). In streaming aggregations, each vector may be carried by multiple packets including a head and tail packet, and one or more body packets between the head and tail packets. All packet types may include vector data. However, head and tail packets may include other data (e.g., data identifying the aggregation and reduction process) that needs to be duplicated in packets sent to each of the aggregation and reduction trees 18. In other embodiments, the splitting of the received vectors 30 may be performed according to any suitable method.

The aggregation and reduction accelerator 28 is configured to perform elementwise operations (block 36) on the split vectors 42 according to the groups 40 yielding the intermediate vector results 32 for the groups 40, respectively. In the example of FIG. 5, the aggregation and reduction accelerator 28 is configured to perform elementwise operations (block 36) on SV1 and SV3 yielding INT V1, and elementwise operations on SV2 and SV4 yielding INT V2.

The network interface 24 of the switch 14 is configured to send the intermediate vector results 32 to different corresponding network switches 14 in different switch aggregation trees 18 (block 110) including sending the first intermediate vector result (e.g., INT V1) to network switch 14-1 in the aggregation and reduction tree 18-1 and the second intermediate vector result (e.g., INT V2) to network switch 14-2 in aggregation and reduction trees 18-2.

Figure 6:
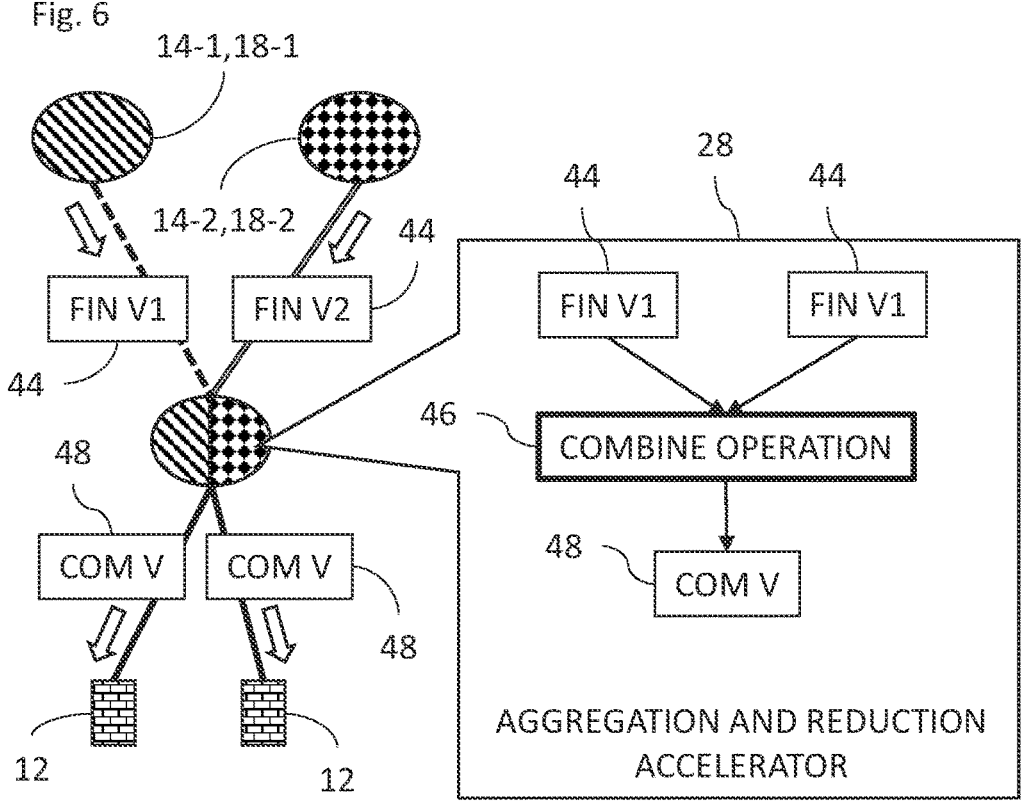
FIG. 6 is a block diagram view illustrating combining vectors in the system of FIG. 1.

Reference is now made to FIG. 6, which is a block diagram view illustrating combining vectors in the system 10 of FIG. 1. The aggregation and reduction accelerator 28 of the switch 14 in the leaf layer 22 is configured to receive (via the network interface 24 of the switch 14) at least two final vector results 44 of the aggregation and reduction process from the different switch aggregation trees 18 including receiving a first final vector result (e.g., FIN V1) from the network switch 14-1 of the aggregation and reduction tree 18-1 and a second final vector result (e.g., FIN V2) from the second network switch 14-2 of the aggregation and reduction tree 18-2 (block 112).

The aggregation and reduction accelerator 28 is configured to combine (block 46) the final vector results 44 to yield a combined final vector result 48 (e.g., COM V) (block 114). The network interface 24 is configured to send the combined final vector result 48 to the endpoint devices 12 (block 116) from which the original vectors 30 were received.

Figure 7:
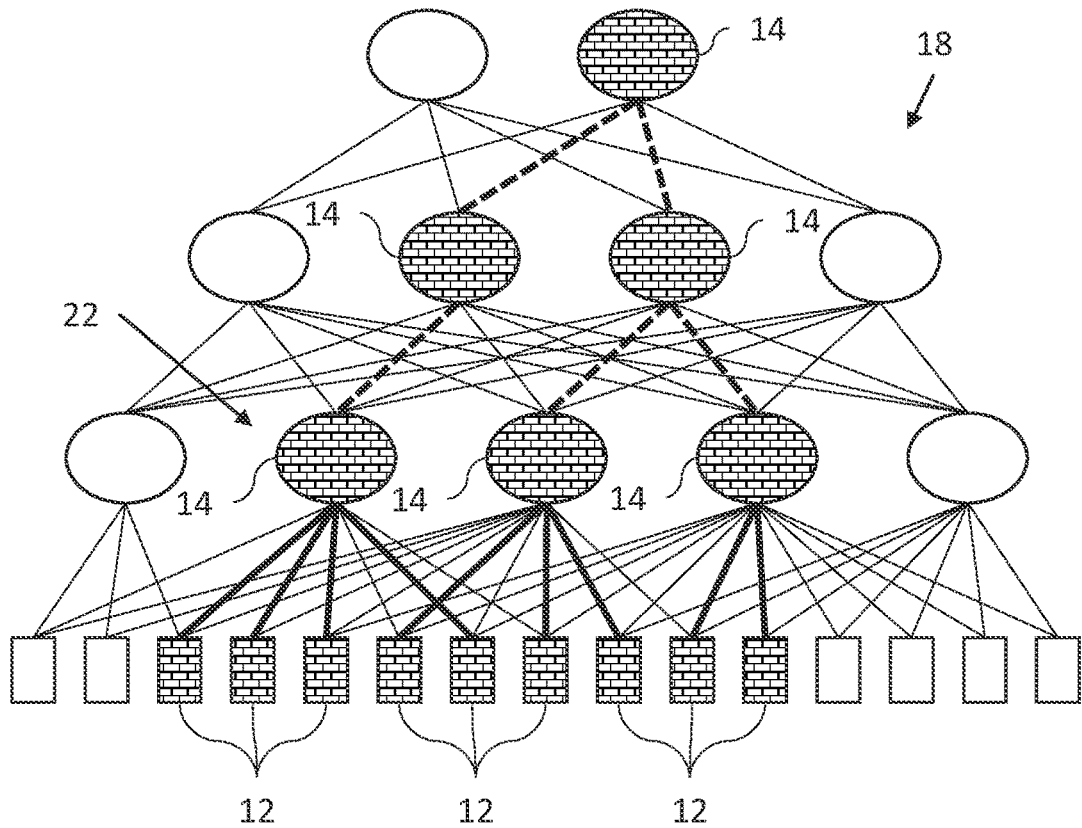
FIG. 7 is a block diagram view of the system of FIG. 1 operating with a single aggregation and reduction tree.

Reference is now made to FIG. 7, which is a block diagram view of the system 10 of FIG. 1 operating with a single aggregation and reduction tree 18. Reference is also made to FIG. 3. As previously mentioned, in some embodiments, splitting the vectors and using more than one aggregation and reduction tree 18 to process the split vectors may be selectively applied and may depend on various factors so that in some case vectors are not split and only one aggregation and reduction tree 18 is used to process the vectors. When a decision is made not to split the vectors in the switches 14 (only some labeled for the sake of simplicity) of the leaf layer 22, the following steps are performed. The aggregation and reduction accelerator 28 of each switch 14 in the leaf layer 22 is configured to: perform elementwise operations on the received given vectors (received from respective endpoint devices 12) yielding an intermediate vector result (block 118); send the intermediate vector result to one of the switches 14 in the layer above the leaf layer 22 in the aggregation and reduction tree 18 (block 120); receive a final vector result from the switch 14 in the layer above the leaf layer 22 in the aggregation and reduction tree 18 (block 122); and send the final vector result to the endpoint devices 12 from which the given vectors were previously received by the switch 14 in the leaf layer 22 (block 124).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network switch device, comprising:
a network interface to receive vectors from endpoint devices as part of an aggregation and reduction process; and
an aggregation and reduction accelerator to:
perform elementwise and vector splitting operations with the received vectors as input yielding at least two intermediate vector results, including a first intermediate vector result and a second intermediate vector result, wherein the network interface is to send the at least two intermediate vector results to different corresponding network switches in different switch aggregation trees including sending the first intermediate vector result to a first network switch in a first switch aggregation tree and the second intermediate vector result to a second network switch in a second switch aggregation tree;
receive at least two final vector results of the aggregation and reduction process from the different switch aggregation trees including receiving a first final vector result from the first network switch and a second final vector result from the second network switch; and
combine the at least two final vector results to yield a combined final vector result, wherein the network interface is to send the combined final vector result to the endpoint devices.

2. The device according to claim 1, wherein the aggregation and reduction accelerator is to:
split the received vectors yielding at least two groups of split vectors; and
perform elementwise operations on the split vectors according to the at least two groups yielding the at least two intermediate vector results for the at least two groups, respectively.

3. The device according to claim 1, wherein the aggregation and reduction accelerator is to:

perform elementwise operations on the received vectors yielding a given vector result; and split the given vector result yielding the at least two intermediate vector results.

4. The device according to claim 1, wherein the aggregation and reduction accelerator is to perform elementwise operations with the received vectors as input, the elementwise operations being selected from any one or more of the following: summation; point wise minimum; point wise maximum; bitwise OR, bitwise NOR, bitwise XOR, maximum value with index, minimum value with index, and a logical operation.

5. The device according to claim 1, wherein the aggregation and reduction accelerator is to perform elementwise summation with the received vectors as input, the received vectors having a floating-point value data type.

6. The device according to claim 1, wherein:

the network interface is to receive the vectors from the endpoint devices in aggregation and reduction protocol packets; and the aggregation and reduction accelerator is to perform vector splitting according to packet boundaries.

7. The device according to claim 1, wherein the aggregation and reduction accelerator is to selectively perform elementwise operations with vector splitting for first received vectors and selectively perform elementwise operations without performing vector splitting for second received vectors.

8. The device according to claim 7, wherein the aggregation and reduction accelerator is to determine to selectively perform elementwise operations with vector splitting for first received vectors based on:

the first received vectors having a floating-point value data type; and the elementwise operations including summation.

9. The device according to claim 8, wherein the aggregation and reduction accelerator is to determine to selectively perform elementwise operations without vector splitting for second received vectors based on either:

the second received vectors not having a floating-point value data type; or the elementwise operations not including summation.

10. The device according to claim 1, wherein the aggregation and reduction accelerator, responsively to an administrator decision, is to selectively perform elementwise operations with vector splitting for first received vectors and selectively perform elementwise operations without performing vector splitting for second received vectors.

11. The device according to claim 1, wherein the aggregation and reduction accelerator, responsively to an aggregation manager decision based on a topology of the network, is to selectively perform elementwise operations with vector splitting for first received vectors and selectively perform elementwise operations without performing vector splitting for second received vectors.

12. A networking method, comprising:

receiving vectors from endpoint devices as part of an aggregation and reduction process;

performing elementwise and vector splitting operations with the received vectors as input yielding at least two intermediate vector results, including a first intermediate vector result and a second intermediate vector result;

sending the at least two intermediate vector results to different corresponding network switches in different switch aggregation trees including sending the first intermediate vector result to a first network switch in a first switch aggregation tree and the second intermediate vector result to a second network switch in a second switch aggregation tree;

receiving at least two final vector results of the aggregation and reduction process from the different switch aggregation trees including receiving a first final vector result from the first network switch and a second final vector result from the second network switch;

combining the at least two final vector results to yield a combined final vector result; and sending the combined final vector result to the endpoint devices.

13. The method according to claim 12, further comprising:

splitting the received vectors yielding at least two groups of split vectors; and performing elementwise operations on the split vectors according to the at least two groups yielding the at least two intermediate vector results for the at least two groups, respectively.

14. The method according to claim 12, further comprising:

performing elementwise operations on the received vectors yielding a given vector result; and splitting the given vector result yielding the at least two intermediate vector results.

15. The method according to claim 12, further comprising performing elementwise operations with the received vectors as input, the elementwise operations being selected from any one or more of the following: summation; point wise minimum; point wise maximum; bitwise OR, bitwise NOR, bitwise XOR, maximum value with index, minimum value with index, and a logical operation.

16. The method according to claim 12, further comprising performing elementwise summation with the received vectors as input, the received vectors having a floating-point value data type.

17. The method according to claim 12, wherein:

the receiving vectors from endpoint devices includes receiving the vectors from the endpoint devices in aggregation and reduction protocol packets; and the performing includes performing vector splitting according to packet boundaries.

18. The method according to claim 12, further comprising:

selectively performing elementwise operations with vector splitting for first received vectors; and selectively performing elementwise operations without performing vector splitting for second received vectors.

19. The method according to claim 18, further comprising determining to selectively perform elementwise operations with vector splitting for first received vectors based on:

the first received vectors having a floating-point value data type; and the elementwise operations including summation.

20. The method according to claim 19, further comprising determining to selectively perform elementwise operations without vector splitting for second received vectors based on either:

the second received vectors not having a floating-point value data type; or the elementwise operations not including summation.

21. The method according to claim 12, further comprising, responsively to an administrator decision:

selectively performing elementwise operations with vector splitting for first received vectors; and selectively performing elementwise operations without performing vector splitting for second received vectors.

22. The method according to claim 12, further comprising, responsively to an aggregation manager decision based on a topology of the network:

selectively performing elementwise operations with vector splitting for first received vectors; and selectively performing elementwise operations without performing vector splitting for second received vectors.

23. A system, comprising a plurality of network switches including different switch aggregation trees of the network switches having a leaf layer of the network switches, wherein:

each of the network switches in the leaf layer is to:

receive vectors from respective endpoint devices as part of an aggregation and reduction process;

perform elementwise and vector splitting operations with the received vectors as input yielding intermediate vector results; and send different ones of the intermediate vector results to the network switches in the different switch aggregation trees;

the network switches in the different switch aggregation trees are to perform at least part of the aggregation and reduction process yielding different final vector results and provide the different final vector results to the network switches in the leaf layer; and each of the network switches in the leaf layer is to:

receive the different final vector results from the different switch aggregation trees;

combine the different final vector results to yield a combined final vector result; and send the combined final vector result to the respective endpoint devices.

\* \* \* \* \*